Jan. 6, 1925.
F. G. BREYER ET AL
1,522,097
MANUFACTURE OF ZINC OXIDE
Filed May 27, 1922    5 Sheets-Sheet 1
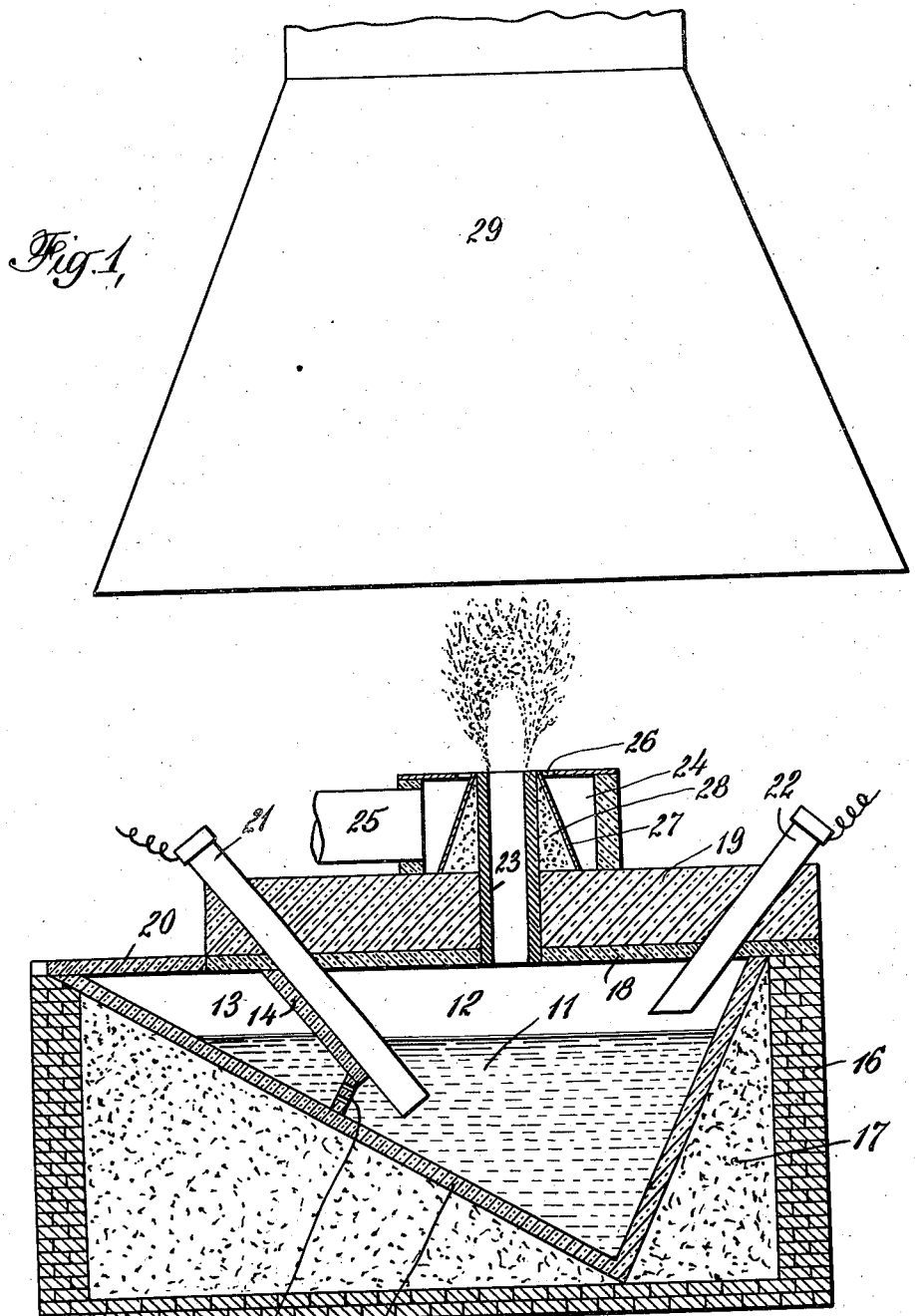
Fig. 1,
Inventor
Frank G. Breyer
Earl C. Gaskill
By their Attorneys James A. Singmaster
Pennie Davis Marvin & Edmonds

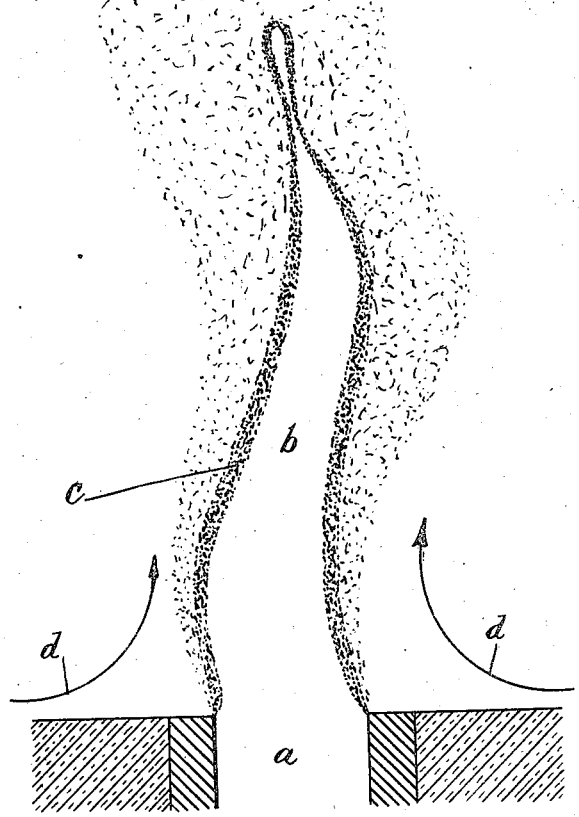

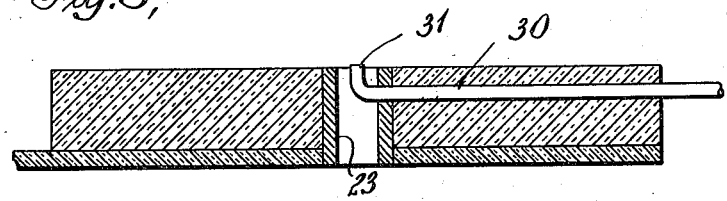
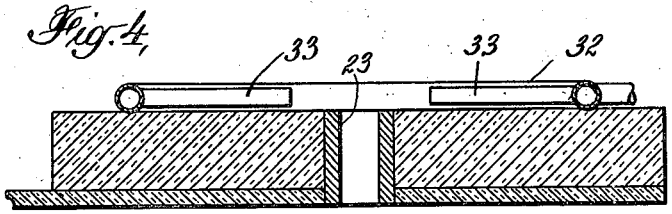
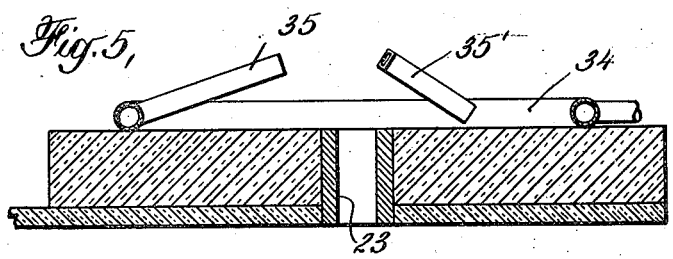
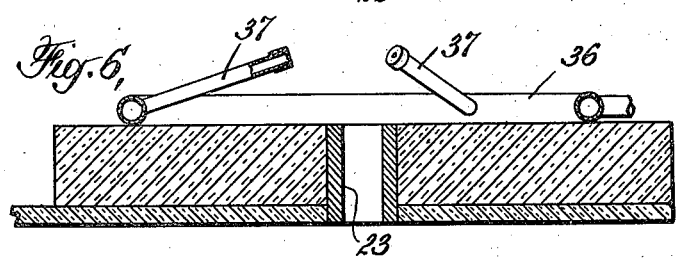
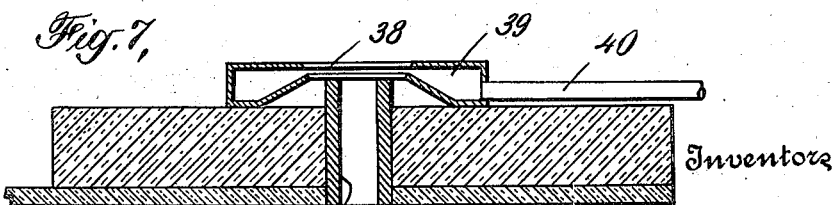

Jan. 6, 1925.　　　　　　　　　　　　　　　　　　　　　1,522,097
F. G. BREYER ET AL
MANUFACTURE OF ZINC OXIDE
Filed May 27, 1922　　　5 Sheets-Sheet 4

INVENTORS
Frank G. Breyer
Earl C. Gaskill
BY James A. Singmaster
their ATTORNEYS

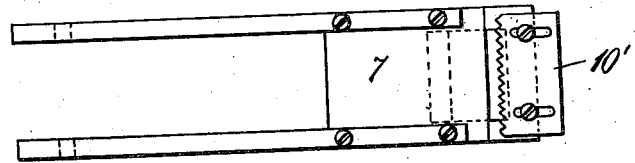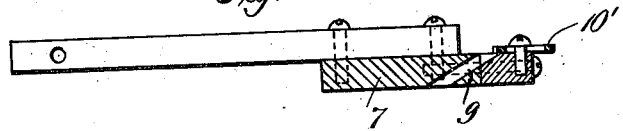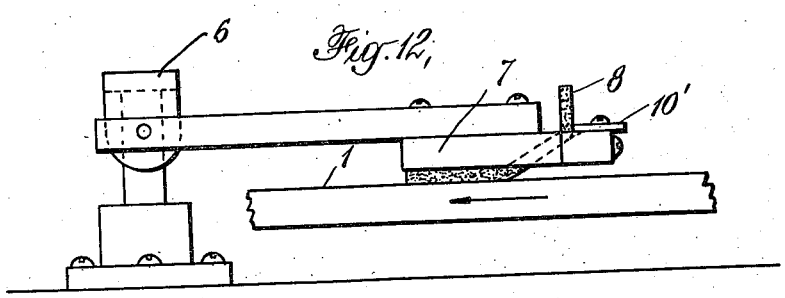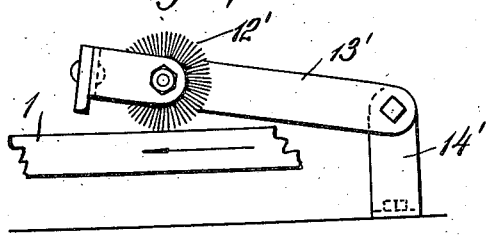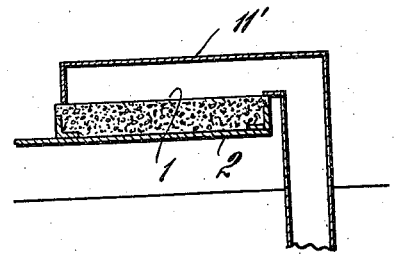

Patented Jan. 6, 1925.

1,522,097

UNITED STATES PATENT OFFICE.

FRANK G. BREYER, EARL C. GASKILL, AND JAMES A. SINGMASTER, OF PALMERTON, PENNSYLVANIA, ASSIGNORS TO THE NEW JERSEY ZINC COMPANY, OF NEW YORK, N. Y., A CORPORATION OF NEW JERSEY.

MANUFACTURE OF ZINC OXIDE.

Application filed May 27, 1922. Serial No. 564,021.

*To all whom it may concern:*

Be it known that we, FRANK G. BREYER, EARL C. GASKILL, and JAMES A. SINGMASTER, citizens of the United States, residing at Palmerton, county of Carbon, State of Pennsylvania, have invented certain new and useful Improvements in the Manufacture of Zinc Oxide; and we do hereby declare the following to be a full, clear, and exact description of the invention, such as will enable others skilled in the art to which it appertains to make and use the same.

This invention relates to the manufacture of zinc oxide, and has for its object the provision of an improved method of manufacturing zinc oxide.

Heretofore, zinc oxide has been generally produced by either the American (or Wetherill) process or by the French (or retort volatilizing) process. The great bulk of the zinc oxide used in the rubber industry as a reinforcing agent has been heretofore manufactured by the American process. In the production of zinc oxide by the American process, a charge of zinciferous material mixed with a reducing agent and spread on an ignited bed of fuel is subjected to a combustion supporting blast or draft and brought to a sufficiently high temperature to reduce the compounds of zinc and volatilize the reduce metal, the zinc vapors burning in drifting or rolling flames above the top of the charge and in the off-take pipes or flues to zinc oxide, which is collected in an appropriate manner. In the French process of producing zinc oxide, metallic zinc is melted and volatilized in appropriate receptacles or retorts, under non-oxidizing conditions, and the resulting metallic zinc vapor drifts or flows out of the mouth of the retort at low velocity and burns in the air with a quiet, rolling or drifting flame, thereby forming the zinc oxide which is collected in an appropriate manner.

In these and other processes heretofore proposed, there has been no appreciation of the fact that the nature of the flame itself has any influence on the physical properties of the oxide, nor has any attempt been made to control the physical properties of the oxide through control of the flame, especially by intensifying and limiting it to the minimum dimensions. The zinc oxide resulting from these prior processes has the physical appearance of an impalpable powder, but as a matter of fact the particles are of a size within the range of photomicrographic measurment with glass lenses and white light.

Our improved method of producing zinc oxide involves directing a blast of relatively cool oxidizing gas, such as air, against an issuing stream of metallic zinc vapor. We have discovered that a zinc oxide product of greatly improved properties and of extreme and ultramicroscopic fineness can be produced by oxidizing an issuing stream of metallic zinc vapor by a blast of relatively cool oxidizing gas, such as air, where the gaseous blast restricts the zinc-oxide-forming area enveloping the issuing stream of zinc vapor and absorbs the heat generated in the zinc-oxide-forming area, thereby lowering the temperature of the combustion or oxidizing zone and cooling the resulting very fine particles of zinc oxide substantially instantaneously after their formation. The oxidation by blasting of the issuing stream of zinc vapor preferably takes place in the open, or in an enviroment which permits such complete dissipation or absorption of the radiant energy of the oxidation as to substantially assist the blast in producing and maintaining a restricted and relatively cool combustion zone. Thus, the oxidation by blasting may advantageously take place in a large open room, and if heat-reflecting objects are in proximity to the zone of oxidation such objects should be maintained at so low a temperature that they absorb rather than reflect the radiant energy of the oxidation.

Preferably, the volume and intensity of the gaseous blast and its heat-absorbing capacity are such that the particles of zinc oxide are cooled below a temperature of 350° C. in a very small fraction of a second, say in one twenty-fifth (1/25) of a second, or less, after their formation. In our preferred practice, the volume, intensity and heat-absorbing capacity of the gaseous blast are such that the apparently white hot zone of combustion or oxidation is in reality so restricted and cool that the bare human hand may be passed back and forth through the combustion zone with impunity where the issuing stream of zinc vapor is approximately the equivalent of 150 pounds of zinc issuing per hour from a nozzle 4 inches in diameter. The stream of zinc vapor may be either undiluted or diluted by other gases such as carbon monoxide, nitrogen, hydrogen, etc., resulting from the method used in producing the zinc vapor.

In the accompanying drawings we have illustrated certain forms of apparatus (in Figs. 1 and 3 to 7) adapted for the practice of the process of the invention, but it is intended and will be understood that the invention is illustrated by, but is not limited to, the use of the particular forms of apparatus thus illustrated and described.

In the accompanying drawings—

Fig. 1 is a sectional elevation, somewhat diagrammatic in its character, of a suitable form of apparatus for the practice of the process of the invention;

Fig. 2 is an explanatory view of a freely burning flame of metallic zinc vapor, burning in air in accordance with normal French process practice of the prior art;

Figure 8:
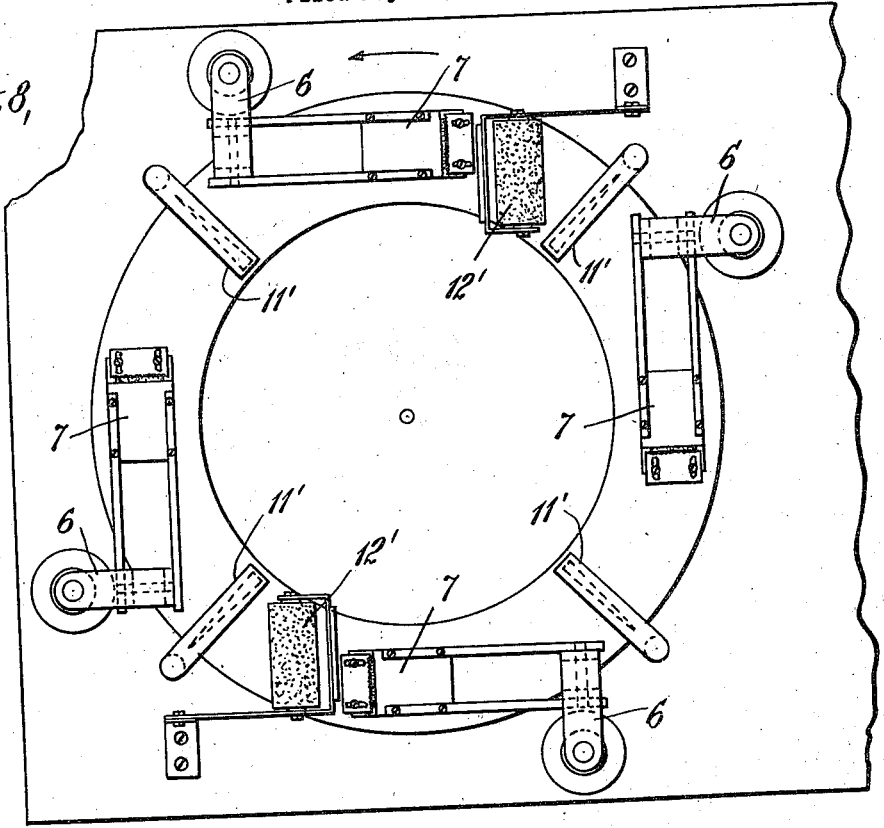
Figure 9:
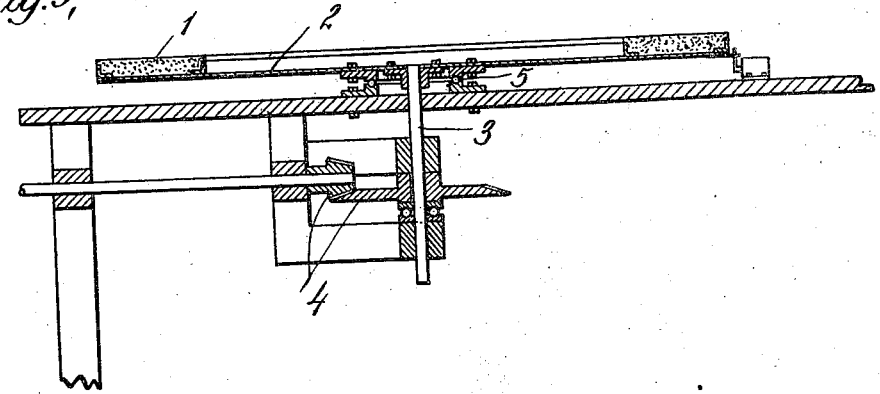

Figs. 3, 4, 5, 6 and 7 illustrate certain modified arrangements of apparatus, similar to parts of Fig. 1, for intensifying the combustion of the zinc vapor and instantaneously chilling and diluting the resulting fume; Figs. 8 to 14 inclusive show an abrasion machine for testing vulcanized rubber products containing the new fume product; Fig. 8 being a plan, Fig. 9 a vertical section (with parts omitted), Figs. 10 and 11 being respectively plan and vertical section of the holder for the rubber samples, Fig. 12 being an enlarged view showing the test specimen in place in the holder and Figs. 13 and 14 being enlarged views of one of the brushes and one of the vacuum chambers respectively.

In the apparatus of Figs. 1 and 3 to 7 various arrangements are shown for intensifying and concentrating the combustion within limited dimensions, and for producing a relatively cool combustion zone, so that the particles of zinc oxide are formed very fine and will be instantly chilled and removed from the region of even slightly elevated temperature prevailing in that zone, the particles being blown through and out of the intensive combustion zone by strong blasts or drafts of air. It will be understood, however, that other and equivalent means can be similarly used, such as a rotating nozzle or orifice which, by its rotation, brings about a similar intensive combustion and instant chilling and dilution of the fume.

The apparatus illustrated in Fig. 1 of the drawings comprises a crucible 10 adapted to contain a substantial quantity of metallic zinc 11. The crucible may be constructed of any appropriate refractory material; we have found a mixture of forty per cent fire clay and sixty per cent carborundum or calcium silicide well adapted for the purpose. The crucible 10 as shown is V-shaped in sectional elevation and in plan is substantially rectangular. The crucible is divided into two compartments 12 and 13 by means of a transverse wall or partition 14. The lower end of the partition 14 is spaced a short distance from the adjacent wall of the crucible and in this space is arranged a perforated diaphragm 15.

The crucible 10 is enclosed by a brick structure 16 and the space between the brick work and the inclined walls of the crucible may, if desired, be filled with heat insulating material 17, such as sil-o-cel. The compartment 12 of the crucible is permanently closed by a cover 18 supporting an appropriate depth of heat insulating material 19. The compartment 13 is normally closed by a removable cover 20.

An electrode 21, preferably of graphite, extends down along the partition 14 well beneath the surface of the zinc in the compartment 12. Another electrode 22, also preferably of graphite, extends into the compartment 12 and terminates at its lower end a short distance above the level of the zinc. The electrodes 21 and 22 are connected to an appropriate source of electric energy, which may be either direct or alternating, and appropriate means (not shown) are provided for regulating the electric current.

A nozzle 23 extends through the cover 18 and superposed layer of insulating material 19, and provides a discharge outlet for the metallic zinc vapor produced in the compartment 12.

Mounted on top of the insulating material 19, and surrounding the nozzle 23, is a circular compartment 24 which is adapted to be supplied with compressed air from any suitable source through the supply pipe 25. The compartment 24 has an annular orifice 26 surrounding the nozzle 23 and discharging upwardly into the escaping stream of metallic zinc vapor. The outer annular wall of the compartment 24 may be of fire brick and the top cover plate of the compartment may be of steel. The cone 27 may be of sheet iron and may have an insulating material, such as sil-o-cel, packed between it and the nozzle 23.

In the practice of the process of the invention with the apparatus illustrated in Fig. 1, metallic zinc is introduced into the crucible until the compartment 12 is filled to about the level indicated with molten zinc, and this approximate level is maintained in the normal operation of the apparatus. The passage of the electric current between the electrode 22 and the surface of the zinc 11 develops sufficient heat to maintain the zinc in a molten condition and to produce sufficient metallic zinc vapor so that a rapid stream of the vapor will escape through the nozzle 23. The heat is also sufficient to melt additions of solid zinc, which may be introduced to the compartment 13 by removing the cover 20.

The space between the top surface of the molten zinc in the compartment 12 and the cover 18 becomes filled with metallic zinc vapor and this vapor passes through the nozzle 23 in a steady stream. As the zinc vapor issues from the nozzle 23 it comes in contact with the surrounding air and if uninfluenced would burn with the characteristic natural zinc flame. The annular nozzle 26 directs an annular or circumferential blast or draft of air inwardly against the escaping stream of zinc vapor and causes its intense combustion. The effect of this air blast is to radically reduce the size of the zinc flame from the size which it would normally have if burning freely in the air without the added blast. The annular air blast has the further effect of lowering the temperature of the combustion zone and instantly chilling and removing the initially very fine particles of zinc oxide from the region of even slightly elevated temperature prevailing in the combustion zone. The zinc oxide particles thus formed are drawn into the lower flared end of a flue 29 by means of a suction fan or the like (not shown) in the flue system, and are conveyed through the flue system to a bag house or to other appropriate means for the collection of the zinc oxide.

The effect which is produced by the air blast in intensifying or concentrating the combustion of the zinc vapor will be evident from a comparison of the intensive combustion zone and the ordinary free-burning zinc flame shown in a somewhat conventional and illustrative manner in Fig. 1 and Fig. 2, respectively. It is difficult to illustrate graphically the difference between this intensive combustion zone and the free-burning zinc flame, but the visual difference is most marked. In Fig. 2 we have illustrated what we now believe to be the conditions attending the free burning in air of a stream of substantial size of zinc vapor, for example, a stream escaping through a nozzle four inches in diameter and at a rate of one hundred and fifty pounds of metallic zinc passing through the nozzle per hour. The metallic zinc vapor is assumed to be discharged upwardly from the vertical orifice or nozzle $a$. A core of metallic zinc vapor $b$ forms above the orifice $a$. The core $b$ of zinc vapor is surrounded by air and the burning of the zinc vapor apparently takes place mainly on the outside of the core where the zinc vapor strikes the surrounding air, and this active combustion zone, indicated at $c$, is the zone of highest temperature. To the extent that the combustion of the zinc vapor may be incomplete in the zone $c$, this zone may be enlarged, and may be of an irregular and eddying character as further amounts of air mix with the partly burned zinc vapor, thus forming a rolling or drifting flame. Surrounding the active combustion zone $c$ is a suspended mass of solid zinc oxide particles. The burning zinc flame creates a draft of air in the direction indicated by the arrows $d$, and this inspirated air draft tends to cause the particles of zinc oxide to hug the flame, so that some particles of the zinc oxide, and more particularly those formed at the base of the flame, may be exposed to the action of the flame for an appreciable period of time as they rise upwardly in or in close proximity to the high temperature zone of combustion. In practice, a free burning flame of the character referred to will have a height of several feet. That is, the zone of incandescence due to the combustion and to the slow cooling of the incandescent particles of zinc oxide as they rise upwardly in admixture with the highly heated gases, is of considerable size, and the particles of zinc oxide are maintained at an incandescent temperature, or a considerable part of the zinc oxide particles are maintained at such temperature, for an appreciable time, so that the particles of the zinc oxide produced have a radically greater particle size than the improved product made in accordance with the present invention.

A flame of the character illustrated in Fig. 2 is produced if the air blast of Fig. 1 is turned off. When, however, the air blast is turned on, the combustion zone is immediately intensified and concentrated, and immediately changes from a flame which is several feet in height to an intense combustion zone which is only some inches in height, and the particles of zinc oxide produced, instead of rising slowly and being maintained at an elevated temperature for an appreciable period of time, are removed substantially instantly from the zone of intense combustion and chilled and diluted simultaneously.

In the actual practice of the invention, in an apparatus of the form illustrated in Fig. 1, we have secured excellent results under the following conditions: The crucible 10 contained approximately 200 pounds of molten zinc. The heating of the zinc was effected with an electric current of about 3,000 amperes, with an alternating potential across the electrodes 21 and 22 of about 30 volts. The nozzle 23 was four inches in diameter and about 150 pounds of metallic zinc were distilled off and passed through the nozzle per hour. About 900 cubic feet of air per minute, at a pressure of about two inches of water, were supplied to the annular compartment 24. The lower end of the fume pipe 29 was ten feet in diameter and was mounted two feet above the discharge end of the nozzle 23. The temperature of the gases entering the lower end of the pipe 29 varied from about 60° C. near the middle to about 20° C. at the periphery. The velocity in the combustion zone was upwards of fifty feet per second and the total height of the combustion zone, although it varied somewhat and was of an irregular character, was considerably less than a foot on the average, so that the particles of zinc oxide are formed and escape from the intensive combustion zone within a very small fraction of a second. The cooling effect of an air blast of the character described is, in fact, so great that the hand can be passed back and forth through the upper portion of what appears to be the combustion zone without injury. This upper part of the apparent combustion zone apparently contains still incandescent particles of zinc oxide diluted by cool air and undergoing rapid chilling, so that the apparent combustion zone or zone of incandescence extends somewhat beyond the high temperature zone of intensive combustion.

Instead of using an annular air blast of low pressure air in the manner illustrated in Fig. 1, other arrangements of air blasts can be similarly used, although we have found the arrangement of Fig. 1 to give very satisfactory results, Figs. 3 to 7, inclusive, illustrate other forms of apparatus which we have found satisfactory, although we regard them as less advantageous than the arrangement of Fig. 1.

In Fig. 3 a compressed air pipe 30 extends through the insulating material 19 and terminates in an upwardly directed discharge orifice 31 arranged in the center of the nozzle 23. We have obtained satisfactory results by blowing from five to ten cubic feet of air per minute at a pressure of about twenty pounds through a one-eighth inch discharge orifice, the other conditions being substantially the same as in the particular example hereinbefore described. There is a tendency for zinc oxide to form around and close the discharge orifice 31 and precaution should be taken to prevent this, such as scraping away the zinc oxide from time to time.

In the arrangement illustrated in Fig. 4 two air pipes 33 are arranged on diametrically opposite sides of the issuing stream of zinc vapor and are supplied with air through pipe 32. These nozzles cause a flattening or narrowing of the zinc combusting zone in one direction and a lengthening or spreading out of that zone in the other.

In the arrangement illustrated in Fig. 5 the air is supplied through pipes 34 to the discharge pipes 35 which are directed against the issuing stream of zinc vapor at a distance above the mouth of the orifice 23.

In the arrangement illustrated in Fig. 6 the compressed air is supplied through an annular pipe 36 to a series of discharge nozzles 37. Three nozzles are shown equally spaced apart and directed at different levels toward the stream of metallic zinc vapor issuing from the nozzle 23. More than three blasts of compressed air may be used. In practice, we have used as many as sixteen air blasts uniformly distributed about the nozzle 23; but we have found that entirely satisfactory results can be obtained with three air blasts arranged in the manner shown.

In the arrangement illustrated in Fig. 7 an annular nozzle is provided somewhat similar to that of Fig. 1, having an air supply pipe 40 and an annular chamber 39 with an annular orifice 38.

In the carrying out of the process with the modified structures illustrated in Figs. 3 to 7, the proper regulation of the air blast enables the combustion of the stream of zinc vapor to be intensified so that the zone of combustion is greatly concentrated, and so that the particles of zinc oxide formed are immediately diluted by an excess of air at a radically lower temperature and instantly chilled. That is, the fine particles of zinc oxide initially formed are scattered or dispersed by the air blast and are enveloped and diluted by the relatively cool blast which has a sufficient heat absorbing capacity so that the particles are substantially instantly chilled, and so that any substantial growth or increase in the size of the initially formed particles is prevented.

The application of the air blasts in the various ways illustrated, accordingly, exerts a dispersing or scattering action, as well as a diluting and chilling action, upon the initially formed particles, and this action is combined with the intensive and concentrated combustion of the zinc vapor, so that both the combustion and the diluting and chilling are, completed substantially instantly. The process is therefore distinguished from processes in which the particles of zinc oxide initially formed are permitted to remain an appreciable time in a hot flame and/or in a hot environment and in which an opportunity is afforded for increase in size of the particles and other changes in the particles such as are characteristic of processes heretofore commercially employed in the manufacture of zinc oxide.

The intense combustion which characterizes the process of our invention is not to be understood as implying combustion at exceedingly high temperatures. We have herein used the word intensive to define the combustion at a high rate within a restricted space or volume. Thus, by intense combustion, we mean the combustion or oxidation of the zinc vapor at a high rate within a restricted space or volume. In practicing the invention in accordance with our preferred practice, the method adopted for producing the intensive combustion, namely a blast of air, lowers the temperature in the restricted combustion zone. One indication that the blast is working under our preferred conditions is the fact that the combustion zone has a bluish white appearance. As the blast is decreased from this optimum intensity, the combustion zone increases in volume and takes on an increasingly yellow tinge characteristic of the normal zinc flame and becomes very much hotter. The absence of this yellow tinge in the combustion zone may be used as a practical working criterion of the optimum intensity of the blast. The limiting factor in intensifying or restricting the combustion zone is the point where all of the zinc vapor is no longer oxidized. Thus, by increasing the blast of air it is possible to intensify the combustion zone to such an extent that increasing amounts of zinc vapor are prevented from oxidizing by the extreme chilling effect of the blast.

The fume product (zinc oxide), produced in the manner hereinbefore described, is characterized by an extremely fine particle size, which distinguishes it from the present day standard high grades of zinc oxide produced by either the American or the French process.

The best commercial grades of America process zinc oxide which we have examined have an average particle size of from 0.38 to about 0.52 microns (a micron is 0.001 millimeter) while the best commercial grades of French process zinc oxide which we have examined have an average particle size of from about 0.36 to about 0.44 microns.

The improved zinc oxide product produced in accordance with the practice of the present invention under favorable conditions has an average particle size of about 0.15 microns and less. The significance of this radical reduction in the size of the particles, in the case of the new product, will be evident from a comparison of the approximate number of particles per gram of the product. In the case of a zinc oxide, such as American or French process zinc oxide, of an average particle size of 0.5 microns, there are approximately 2.64 trillions of particles per gram; while with a product with an average particle size of 0.4 microns, there are approximately 5.17 trillion particles. With a product having an average particle size of 0.15 microns, the number of particles per gram is about 95.22 trillions; while with a product having an average particle size of 0.1 microns, the number of particles increases to about 331 trillions. In other words, the improved zinc oxide product, produced in the manner hereinbefore described, with an average particle size of 0.15 or less, contains many times as many particles per unit weight as the best commercial grades of American and French process oxides heretofore available.

When we refer to particle size, and to the number of particles per gram of zinc oxide, we mean the diameter of the average particle, and we will define the diameter of a particle, for purposes of the present specification and appended claims, as the harmonic mean of the three cubical dimensions which is derived from measurements of these dimensions.

The definition and determination of the particle size, in the case of products such as zinc oxide, is rendered difficult because of the extreme fineness, and because of the enormous number of particles which even a small amount of the oxide contains. One may speak definitely of the diameter of a sphere, and of the definite particle size of a mass of spheres of uniform diameter; but in the case of zinc oxid we are dealing with a material which is not in the form of spheres and whose particles are not perfectly uniform, and hence the meaning of particle size is less definite than in the case of uniform spheres, and we have accordingly defined what we mean by particle size in the present specification.

The numerical values of particle size (i. e., diameter of the average particle) which we have given have been determined by photomicrographing with blue light (with a 2-millimeter homogeneous immersion apochromatic lens of 1.3 numerical aperture and at a magnification of 1500 diameter) specimens properly dispersed in glycerin. These determinations have been made in accordance with the procedure described in the paper by Henry Green, Journal of the Franklin Institute, November, 1921, pages 637–666. Owing, however, to the ultra microscopic size of the particles of the zinc oxide product produced in the manner hereinbefore described, recourse must be had to the use of ultra violet light and quartz lenses in carrying out the photo-micrographic method of measurement. The use of ultra violet light in micro-photographic methods is described, for example, in an article by Koehler and von Rohr, Zeitschrift fuer Instrumentenkunde, volume 24, pages 341-349.

Owing to the extreme particle size which characterizes the improved zinc oxide product produced in the manner hereinbefore described, and the radically increased number of particles which a unit weight of the product contains, the product can be used to advantage for various purposes. The new product is of particular value for use in compounding with rubber, and its use enables a radical improvement to be obtained in the resistance to abrasion of the rubber composition, while it also enables a marked increase to be obtained in the tensile strength of the rubber, and we have also obtained an acceleration of the cure.

Zinc oxide has long been used extensively in the rubber industry, and its use results in a marked improvement in the resistance of the rubber to abrasion. Crude, unreinforced rubber, when cured with the proper amount of sulphur and accelerator, has a low resistance to abrasive wear, and is totally unsuited for use, for example, as a tire tread stock.

When, however, zinc oxide is compounded with rubber, a very satisfactory rubber compound from the standpoint of resistance to abrasive wear is obtained.

The new zinc oxide product produced in the manner hereinbefore described is particularly advantageous for use as a rubber reinforcer, and its use enables a radically increased resistance to abrasive wear to be obtained, as well as higher tensile strength. The new fume product is particularly valuable as a reinforcing or strengthening agent in rubber stock which is to be used in the treads of pneumatic tires or in the body of solid truck tires. The new product enables a resistance to abrasive wear to be obtained approximating or even exceeding one hundred per cent. more than with the best grades of zinc oxide heretofore industrially employed for reinforcing rubber.

As a standard of comparison, we will refer to the best grade of rubber reinforcing zinc oxide now manufactured as exemplified by the New Jersey Zinc Company's special grade Horsehead brand of zinc oxide. The Horsehead brand of zinc oxide has been most extensively used in the rubber industry for many years, and the special grade has been the accepted standard of uniformity in zinc oxide for rubber compounding over a number of years. This oxide has been made for many years by the well-known American or Wetherill process from the unique franklinite ore of the Franklin mine in New Jersey. The properties and uniformity of this oxide are well recognized, and are referred to in standard authorities on pigments. This oxide has a particle size of about 0.5 micron, a lead content of about 0.15%, expressed as PbO and a total sulfur content, expressed as $SO_3$ of from 0.3 to 0.4%. In the comparative illustrative examples hereinafter given, this product will be referred to as the standard of comparison.

The resistance to abrasive wear of compounded rubber has heretofore been commonly measured by manufacturing a vehicle tire with two or more kinds of rubber stock forming separate segments of the tread. This tire is then placed in actual use and the relative rates of wear of the several segments observed and measured. In order to avoid the cost and to shorten the time required for such actual service tests, test methods of determining the relative abrasive resistance of compounded rubber have been devised. One such test method consists in subjecting the several pieces of compounded rubber to the abrasive action of a revolving sharp sand concrete track and comparing the relative volume losses after a predetermined time.

In order that the method of determining resistance to abrasion (abrasion indices) may be understood, we have illustrated, in the accompanying drawings, a machine which we have found very satisfactory and which has been found to give comparative results closely approximating those obtained in actual use with automobile tires. The abrasion machine consists essentially of a revolving track of outside diameter about 30 inches and inside diameter 20 inches. The surface of this track consists of concrete of the following composition by volume:

| | Parts. |
|---|---|
| Portland cement | 1 |
| Sharp crushed lump quartz, 10-14 mesh | 3 |
| Lime | $\frac{1}{10}$ |

This composition is moistened with water and molded into the desired form. The cement content is only sufficient to bind the particles together, and the track consists essentially of quartz particles. After about 24 hours the top layer of quartz particles are removed by abrading the track with a rasp or other suitable abrading material.

In Figs. 8 to 14 the rotatable concrete track is indicated at 1, this concrete track being supported by a rotatable iron plate 2 which is rotated through the central shaft 3 by means of gears 4, operated by any suitable means. The rotating track is supported by ball bearings 5. Above the track and independent of it are supports 6 to which are pivoted the holders 7 for the rubber specimens. The specimens 8 are inserted in the manner illustrated in Fig. 12 and are secured in place by clamps 10'. The slot 9 through which the rubber sample is inserted is at an angle of 30°. Suction pipes 11' are arranged as shown and are connected with a suction fan. These suction pipes keep the track free from rubber dust which abrades from the samples under test. Brushes 12' are arranged at an angle as shown and assist in keeping the track free from abraded rubber. The suction devices and the brush both assist in keeping the track clean. In order to be sure on this point, however, the track is stopped every 500 revolutions and thoroughly brushed off. The brushes are supported by pivoted arms 13' pivoted to supports 14'. The holder 7 has a weight of 3 pounds, the length of the arm from the nearest edge of the holder to the bearing being 6 inches. The holder itself has a length of 5 inches, a width of 3 inches and a thickness of $\frac{9}{16}$ inches. The rubber specimen has a size of 2 inches by 5 inches by ⅛ inch and is inserted in the holder so that its area of contact with the track will be 4 sq. in. The track rotates counter-clockwise, as indicated by the arrow in Fig. 12.

In the use of the abrasion machine, the compounded rubber specimens to be abraded are held stationary with respect to the revolving track, the arrangement being as illustrated in Fig. 12. The rubber specimen is held against the track by the weight of the clamp, which is constant. The clamp is free to move vertically to take care of unevenness of the track. The track is rotated at such a speed (about 32 R. P. M.) that approximately 0.3 cu. in. of rubber are abraded for 1000 revolutions of the track from a sample of rubber stock compounded with the aforementioned special grade Horsehead brand zinc oxide in accordance with the following composition:

|  | Grams. |
|---|---|
| First latex pale crêpe (washed and dried) | 920 |
| Sulfur | 55 |
| Hexamethylenetetramine | 6 |
| Zinc oxide | 1,260 |
|  | 2,241 |

The crude rubber is first treated on the milling rolls, and when appropriately broken down, the other ingredients of the composition are worked therein. After this mixture has been appropriately worked on the milling rolls thoroughly to incorporate all of the ingredients uniformly throughout the crude rubber, the resulting product is allowed to stand for an appropriate period of time, usually twenty-four hours or so, and is then put into a hydraulic press vulcanizer and vulcanized. The time of cure is 90 minutes at a temperature of 141° C. with a hydraulic pressure of 2000 pounds per sq. in. in a press having a ram diameter of 10 inches and with the area of the rubber between the platens of 120 sq. in. After the rubber has been removed from the press for 24 hours it is tested for tensile and abrasion resistance qualities.

In operating the abrasion machine, four rubber specimens are arranged with the holders equally spaced apart over the track, so that all four specimens are subjected to the same treatment, thus giving relative values. By weighing the sample before and after abrasion and determining its specific gravity, the volume loss can be computed. The figures for relative abrasion resistance of different rubber stocks, as determined on the abrasion machine above described, have been found to check up very closely with the relative abrasion resistance of those same stocks when put on as segments of a vehicle tire and subjected to actual service wear. In using the abrasion machine, the volume losses of the rubber specimens are determined by the losses in weight of the specimens divided by their respective specific gravities. Since the volume loss of a specimen varies inversely as its resistance to abrasive wear, it is customary to indicate the abrasive resistance as the reciprocal of the volume loss, and this practice has been followed in the determination of the numerical figures for abrasion resistance given herein. For example, if the abrasion index of the standard test specimen is assigned an arbitrary value of 115, and if the volume loss of the standard is 4.050 per 1000 revolutions and that of the specimen to be compared is 6.265, then the abrasion index of the last mentioned test specimen will be $$\frac{4.050}{6.265} \times 115 = 74.$$

The advantages which the new zinc oxide product made as hereinbefore described possesses, when used as a strengthening or reinforcing agent in compounded rubber, will be illustrated by the following comparative tests or examples. The first two examples show compounds made up in accordance with the formula hereinbefore specified, one containing the well known special grade Horsehead brand zinc oxide as now manufactured and of the composition above referred to, and the other containing an equal weight of the new fume product produced in the manner hereinbefore described, the two compositions being properly cured and the relative resistance to abrasion being determined in the manner above described.

The following tables indicate the results obtained with rubber compositions compounded as hereinbefore described. Determination No. 1 was made with a rubber composition containing special grade Horsehead brand zinc oxide of the composition and properties hereinbefore referred to.

Determination No. 2 was made with the new fume product.

|  | Time of cure minutes @ 40#s. | Tensile strength lbs./sq. in. | Per cent elongation. | Abrasion resistance. | After 14 days @ 70° C. | | Vulc. coeff. | Load lbs./sq. in. | |
|---|---|---|---|---|---|---|---|---|---|
|  |  |  |  |  | Tensile strength lbs./sq. in. | Per cent elongation. |  | 300% elong. | 450% elong. |
| Horsehead brand zinc oxide | 45 | 2,970 | 619 | 70 | 2,205 | 571 | --------- | 595 | 1,380 |
|  | 60 | 3,007 | 594 | 94 | 2,177 | 533 |  | 697 | 1,570 |
|  | 75 | 3,233 | 601 | 109 | 1,948 | 480 | 1.7 | 820 | 1,795 |
|  | 90 | 3,225 | 599 | 120 | 1,548 | 397 | 2.2 | 742 | 1,595 |
|  | 105 | 3,017 | 578 | 123 | 1,566 | 387 | 2.6 | 840 | 1,710 |
|  | 120 | 2,858 | 555 | 132 | 1,096 | 247 | 3.0 | 850 | 1,730 |
| New fume product | 30 | 3,313 | 632 | 185 | 2,863 | 544 | 3.4 | 712 | 1,920 |
|  | 45 | 3,996 | 628 | 266 | 2,785 | 503 | 2.7 | 983 | 2,230 |
|  | 60 | 3,637 | 586 | 290 | 2,355 | 417 | 4.0 | 1,242 | 2,557 |
|  | 75 | 3,485 | 587 | 275 | 2,147 | 363 | 4.6 | 1,287 | 2,525 |
|  | 90 | 3,252 | 572 | 315 | 1,996 | 342 | ------ | 1,140 | 2,395 |
|  | 105 | 3,240 | 569 | 282 | 1,416 | 239 | ------ | 1,337 | 2,465 |
|  | 120 | 2,856 | 567 | 257 | 1,320 | 224 | ------ | 1,212 | 2,250 |

From the above tables it will be seen that the new fume product imparted to the vulcanized composition a radically increased abrasion resistance amounting to around one hundred per cent increase. It will also be seen that the new fume product gave a materially increased tensile strength and appreciably increased the rate of cure. It also gave a marked improvement in the resistance to heat aging.

Further comparative results are illustrated in the table which follows. The compositions tested were made according to the following formula:

|  | Parts. |
|---|---|
| First latex pale crêpe | 920 |
| Sulphur | 37 |
| Hexamethylenetetramine | 12 |
| Zinc oxide | 1,035 |

The first part of the table shows the results obtained with the new fume product. The second part of the table shows the results obtained with the Horsehead brand zinc oxide hereinbefore referred to.

|  | Time of cure minutes @ 40#s. | Tensile strength lbs./sq. in. | Per cent elongation. | Abrasion resistance. | After 14 days @ 70° C. | | Vulc. coeff. | Load lbs./sq. in. | |
|---|---|---|---|---|---|---|---|---|---|
|  |  |  |  |  | Tensile strength lbs./sq. in. | Per cent elongation. |  | 30% elong. | 45% elong. |
| New fume product | 30 | 3,595 | 752 | 72 | 2,948 | 607 | 1.5 | 400 | 1,045 |
|  | 45 | 3,428 | 698 | 132 | 3,727 | 626 | 2.0 | 517 | 1,305 |
|  | 60 | 3,995 | 708 | 166 | 3,520 | 596 | 2.5 | 570 | 1,405 |
|  | 75 | 4,030 | 686 | 191 | 3,228 | 553 | 2.9 | 705 | 1,600 |
|  | 90 | 3,920 | 668 | 206 | 3,212 | 555 | 3.2 | 670 | 1,475 |
|  | 105 | 3,833 | 679 | 226 | 2,443 | 491 | 3.4 | 690 | 1,470 |
| Horsehead brand zinc oxide | 30 | 3,017 | 696 | 49 | 2,472 | 625 | 1.0 | 424 | 1,015 |
|  | 45 | 3,367 | 676 | 62 | 2,845 | 614 | 1.4 | 523 | 1,280 |
|  | 60 | 3,413 | 642 | 92 | 2,925 | 578 | 1.9 | 593 | 1,410 |
|  | 75 | 3,575 | 641 | 99 | 2,747 | 536 | 2.1 | 675 | 1,480 |
|  | 90 | 3,570 | 659 | 100 | 2,768 | 563 | 2.5 | 593 | 1,358 |
|  | 105 | 3,267 | 629 | 109 | 2,280 | 489 | 2.7 | 672 | 1,490 |

The following tables further illustrate the results obtained with the new product as compared with the results obtained with the special brand of Horsehead oxide hereinbefore referred to as a standard of comparison. The composition used in the first two comparative samples was made up of 920 parts of rubber, 55 parts of sulfur, 1260 parts of zinc oxide and one part of diphenyl guanidine as an accelerator. The second comparative results were obtained with a compound made of 920 parts of rubber, 55 parts of sulfur, 1035 parts of zinc oxide and 25 parts of thiocarbanilid.

|  | Time of cure minutes @ 40#s. | Tensile strength lbs./sq. in. | Per cent elongation. | Abrasion resistance. | After 14 days @ 70° C. | | | Load lbs./sq. in. | |
|---|---|---|---|---|---|---|---|---|---|
|  |  |  |  |  | Tensile strength lbs./sq. in. | Per cent elongation. |  | 300% elong. | 450% elong. |
| Horsehead brand zinc oxide | 45 | 2,503 | 654 | 95 | 1,693 | 601 | ------ | 462 | 1,194 |
|  | 60 | 2,640 | 644 | 43 | 1,917 | 601 |  | 568 | 1,240 |
|  | 75 | 2,537 | 625 | 59 | 2,038 | 593 | 1.4 | 544 | 1,250 |
|  | 90 | 2,798 | 654 | 70 | 2,013 | 509 |  | 586 | 1,285 |
|  | 105 | 2,797 | 629 | 72 | 1,850 | 551 | 1.7 | 626 | 1,328 |
|  | 120 | 2,683 | 623 | 80 | 1,833 | 551 | 2.0 | 580 | 1,325 |
| New fume product | 45 | 3,408 | 598 | 172 | 2,638 | 545 | 3.3 | 745 | 2,010 |
|  | 60 | 3,300 | 576 | 206 | 2,492 | 484 | 3.9 | 935 | 2,010 |
|  | 75 | 3,567 | 633 | 247 | 2,435 | 476 | 4.1 | 883 | 1,883 |
|  | 90 | 3,450 | 605 | 252 | 1,813 | 346 | ------ | 1,055 | 2,155 |
|  | 105 | 3,430 | 610 | 259 | 1,653 | 307 | ------ | 1,050 | 2,040 |
|  | 120 | 3,210 | 606 | 234 | 1,635 | 298 | ------ | 923 | 1,885 |

|  | Time of cure minutes @ 40#s. | Tensile strength lbs./sq. in. | Per cent elongation. | Abrasion resistance. | After 14 days @ 70° C. | | Vulc. coeff. | Load lbs./sq. in. | |
|---|---|---|---|---|---|---|---|---|---|
|  |  |  |  |  | Tensile strength lbs./sq. in. | Per cent elongation. |  | 300% elong. | 450% elong. |
| Horsehead brand zinc oxide | 45 | 2,780 | 647 | 59 | 2,528 | 588 |  | 506 | 1,230 |
|  | 60 | 2,803 | 632 | 70 | 2,541 | 583 | 1.9 | 560 | 1,295 |
|  | 75 | 2,708 | 606 | 75 | 2,326 | 539 | 2.3 | 637 | 1,325 |
|  | 90 | 2,872 | 622 | 91 | 1,943 | 484 | 2.5 | 620 | 1,390 |
|  | 120 | 2,780 | 601 | 107 | 1,090 | 300 |  | 688 | 1,500 |
|  |  |  |  |  |  |  |  | 860 | 1,950 |
| New fume product | 45 | 3,690 | 624 | 190 | 3,093 | 546 |  | 1,015 | 2,075 |
|  | 60 | 3,613 | 620 | 207 | 2,325 | 422 | 4.3 | 1,075 | 2,100 |
|  | 75 | 3,593 | 620 | 223 | 1,746 | 331 | 4.9 | 970 | 2,010 |
|  | 90 | 3,696 | 627 | 238 | 1,476 | 282 | 5.1 | 925 | 1,910 |
|  | 120 | 3,033 | 572 | 230 | 1,090 | 211 |  |  |  |

The marked improvement in the vulcanized rubber products obtained with the new fume product of the present invention will be readily appreciated by rubber technologists. The improved results which the present invention enables to be obtained are not obtainable, insofar as we are aware, with any zinc oxide heretofore commercially available.

The use of the new fume product of our preferred practice involves such a radical improvement over the zinc oxide compounding agents heretofore commercially employed that precautions should be taken to avoid over-vulcanization when it is used, e. g., by reducing the amount of sulphur or the time of vulcanization, etc.

When the new fume product is made in the manner hereinbefore described, by the vaporization of high grade zinc and the intensive combustion of the zinc vapor, with substantially instantaneous dilution and chilling of the resulting fume, the fume product is free or substantially free from impurities, such as chloride, sulphate, etc., and we attribute in part the radically improved properties of the new product as a rubber reinforcing agent to the absence or substantial absence of such impurities.

The unique qualities of the product of our preferred practice, as described above, are strikingly illustrated by its behavior when compounded with plantation rubber in the absence of sulfur or any other compounding ingredient.

After mixing the oxide into the rubber in the usual way on the rolls the compound will be seen to act short and dry and have a marked tendency to roughen on the surface, very much like a stock that contains sulfur and too fiery an accelerator and that is "scorching on the rolls," to use rubber mill language.

If a sample of the compound mixed as above and containing about 20 volumes of zinc oxide of the invention to 100 volumes of first latex pale crêpe is suspended in benzol the compound will not dissolve to a milky suspension as is the moral action of unvulcanized zinc oxide compounds of the prior art, but the sample will remain apparently but slightly affected, outside of some swelling, and the benzol will stay fairly clear, resembling in this respect a compound that has been vulcanized or air cured.

No other pigment in commercial use behaves like this and we are inclined to attribute some of the excellent properties of rubber compounds containing the oxide of the invention to this apparent affinity for rubber which has no parallel in the zinc oxides manufactured in accordance with the heretofore customary practices of the prior art or in any pigment to our knowledge.

As the result of our investigations and researches, we have determined that the average particle size of a zinc oxide has a very considerable influence upon the properties of the oxide as a rubber reinforcing agent. It is our present opinion that the improved properties of the zinc oxide, made in accordance with our present invention, as a rubber reinforcing agent are probably due in large measure to its greater degree of subdivision or finer particle size. We have actually demonstrated that the finer the particle size of a zinc oxide, the greater is its reinforcing or strengthening power in rubber, and in particular its capacity for imparting to rubber resistance to abrasive wear.

While, in the light of the information derived from our resources and investigations, we attribute the increased reinforcing power of the zinc oxide made in accordance with our present invention to its greater degree of subdivision or fineness of particle size, we do not wish to restrict ourselves to this explanation or interpretation of the superior properties of the zinc oxide for imparting to compounded rubber resistance to abrasive wear. The chemical and physical properties of zinc oxide as a rubber reinforcer appear to be so intimately associated that in attributing the increased reinforcing power of the zinc oxide to particle size we may be attributing this improved property to simply one of the manifestations of a cause and not to the cause itself.

In certain of the appended claims, we have defined our improved method of making zinc oxide with respect to its applicability for producing a zinc oxide product possessing superior capacity for imparting to compounded rubber resistance to abrasive wear. This manner of defining the present invention has been adopted merely for the purpose of identifying the improved method of the invention and for clearly distinguishing this method from the heretofore customary methods of manufacturing zinc oxide. It is to be understood that we do not intend thereby to limit the application of the present invention to the production of zinc oxide for use as a rubber reinforcer, but we aim in the appended claims to cover the application of our improved method of manufacturing zinc oxide irrespective of the particular use to which the resulting zinc oxide product is put. We have adopted, as a standard of comparison, the special grade Horsehead brand zinc oxide, whose present day quality we have hereinbefore defined, because this is the present-day recognized standard of high grade zinc oxide for rubber compounding.

We claim:

1. The method of producing zinc oxide which comprises burning zinc vapor and subjecting the burning vapor to sudden chilling by a blast of air.

2. The method of producing zinc oxide, which comprises burning zinc vapor and subjecting the zinc oxide particles formed to sudden chilling, the combustion and cooling being intensified to cause substantially instant removal and chilling of the initially formed particles of zinc oxide.

3. The method of producing zinc oxide, which comprises burning zinc vapor and directing a chilling blast of air upon the burning vapor, whereby the initially formed particles of zinc oxide are substantially instantly enveloped by the excess air and chilled.

4. The method of producing zinc oxide, which comprises vaporizing zinc and forming a flowing stream of zinc vapor, and effecting the intensive combustion of said stream and the substantially instantaneous chilling of the initially formed particles of zinc oxide, by directing a blast of air upon the said stream.

5. The method of producing zinc oxide, which comprises vaporizing zinc and forming a flowing stream of zinc vapor, and intensifying the combustion and chilling of the particles of oxide formed so that the time of combustion and chilling is less than about one-fiftieth of a second.

6. The method of producing zinc oxide, which comprises burning zinc vapor and subjecting the zinc oxide particles formed to substantially instantaneous chilling, the combustion and cooling being intensified to give a fume product with an average particle size not exceeding about 0.15 micron.

7. The method of producing zinc oxide which comprises directing a blast of relatively cool oxidizing gas against an issuing stream of metallic vapor and thereby restricting the zinc-oxide-forming area enveloping the issuing stream of zinc vapor and cooling the resulting particles of zinc oxide substantially instantaneously after their formation.

8. The method of producing zinc oxide which comprises directing a circumferential blast of relatively cool air against an issuing stream of metallic zinc vapor and thereby restricting the zinc-oxide-forming area enveloping the issuing stream of zinc vapor and cooling the resulting particles of zinc oxide substantially instantaneously after their formation.

9. The method of producing zinc oxide which comprises directing a blast of relatively cool oxidizing gas against an issuing stream of metallic zinc vapor and thereby restricting the zinc-oxide-forming area enveloping the issuing stream of zinc vapor and cooling the resulting particles of zinc oxide below a temperature of 350° C. in a very small fraction of a second after their formation.

10. The method of producing zinc oxide which comprises directing a circumferential blast of relatively cool air against an issuing stream of metallic zinc vapor and thereby restricting the zinc-oxide-forming area enveloping the issuing stream of zinc vapor and cooling the resulting particles of zinc oxide below a temperature of 350° C. in a very small fraction of a second after their formation.

11. The method of producing zinc oxide which comprises directing a blast of relatively cool oxidizing gas against an issuing stream of metallic zinc vapor, the volume and intensity of the gaseous blast and its heat-absorbing capacity being such that the apparently white hot zone of oxidation is so restricted and cool that the bare human hand can be passed back and forth through the oxidizing zone or flame with impunity where the issuing stream of zinc vapor is approximately the equivalent of 150 pounds of zinc issuing per hour from a nozzle 4 inches in diameter.

12. The method of producing zinc oxide which comprises directing a blast of relatively cool oxidizing gas against an issuing stream of metallic zinc vapor, the volume and intensity of the gaseous blast and its heat-absorbing capacity being such that the height of the flame of burning zinc vapor does not exceed one foot on the average where the issuing stream of zinc vapor is approximately the equivalent of 150 pounds of zinc issuing per hour from a nozzle 4 inches in diameter.

13. The method of producing zinc oxide which comprises directing a blast of relatively cool oxidizing gas against an issuing stream of metallic zinc vapor, the volume and intensity of the gaseous blast and its heat-absorbing capacity being such that the temperature of the resulting zinc oxide laden fume at a distance not exceeding three feet from the issuing stream of zinc vapor is less than 100° C. where the issuing stream of zinc vapor is approximately the equivalent of 150 pounds of zinc issuing per hour from a nozzle 4 inches in diameter.

14. The method of producing zinc oxide which comprises directing a blast of relatively cool oxidizing gas against an issuing stream of metallic zinc vapor, the volume and intensity of the gaseous blast and its heat-absorbing capacity being such that the resulting zinc oxide product has an average particle size not exceeding 0.15 microns.

15. The method of producing zinc oxide which comprises directing a blast of relatively cool oxidizing gas against an issuing stream of metallic zinc vapor, the volume and intensity of the gaseous blast and its heat-absorbing capacity being such that the resulting zinc oxide product has the capacity of imparting to compounded rubber an increased resistance to abrasion of about 100% or more as compared with special grade Horsehead brand zinc oxide.

16. The method of producing zinc oxide which comprises burning zinc vapor and subjecting the burning vapor to a blast of air of such volume, intensity and heat-absorbing capacity that the temperature of the resulting zinc oxide laden fume at a distance not exceeding 3 feet from the burning zinc vapor is less than 100° C.

17. The method of producing zinc oxide which comprises burning a flowing stream of metallic zinc vapor, and subjecting the burning zinc vapor to a blast of air of such volume, intensity and heat-absorbing capacity that the resulting particles of zinc oxide are cooled substantially instantaneously after their formation where the flowing stream of zinc vapor is approximately the equivalent of 150 pounds of zinc issuing per hour from a nozzle 4 inches in diameter.

18. The method of producing zinc oxide which comprises burning a flowing stream of metallic zinc vapor in the open, and subjecting the products of combustion of the burning zinc vapor to sudden cooling by a blast of air directed against the flowing stream of zinc vapor.

19. The method of producing zinc oxide which comprises burning in the open a flowing stream of metallic zinc vapor at the rate of at least 150 pounds of zinc per hour and subjecting the products of combustion of the burning zinc vapor to the action of a chilling blast of air.

20. The method of producing zinc oxide which comprises burning metallic zinc vapor in the open and subjecting the products of combustion of the burning zinc vapor to the action of a blast of cooling gas and thereby producing a zinc oxide product having the capacity of imparting to compounded rubber an increased resistance to abrasion of about 100% or more as compared with special grade Horsehead brand zinc oxide.

FRANK G. BREYER.
EARL C. GASKILL.
JAMES A. SINGMASTER.